APPARATUS FOR MAINTAINING TRANSVERSE REGISTRATION OF A MOVING WEB

Filed July 7, 1965 2 Sheets-Sheet 1

INVENTOR.
HUBERT BLESSING
BY
Albert C. Johnston
ATTORNEY

INVENTOR.
HUBERT BLESSING
BY
Albert C. Johnston
ATTORNEY

United States Patent Office 3,323,740
Patented June 6, 1967

3,323,740
APPARATUS FOR MAINTAINING TRANSVERSE REGISTRATION OF A MOVING WEB

Hubert Blessing, Brooklyn, N.Y., assignor to William F. Huck, doing business as Huck Company, Montvale, N.J., a sole proprietor Filed July 7, 1965, Ser. No. 470,106
11 Claims. (Cl. 242—57.1)

Figure 1:
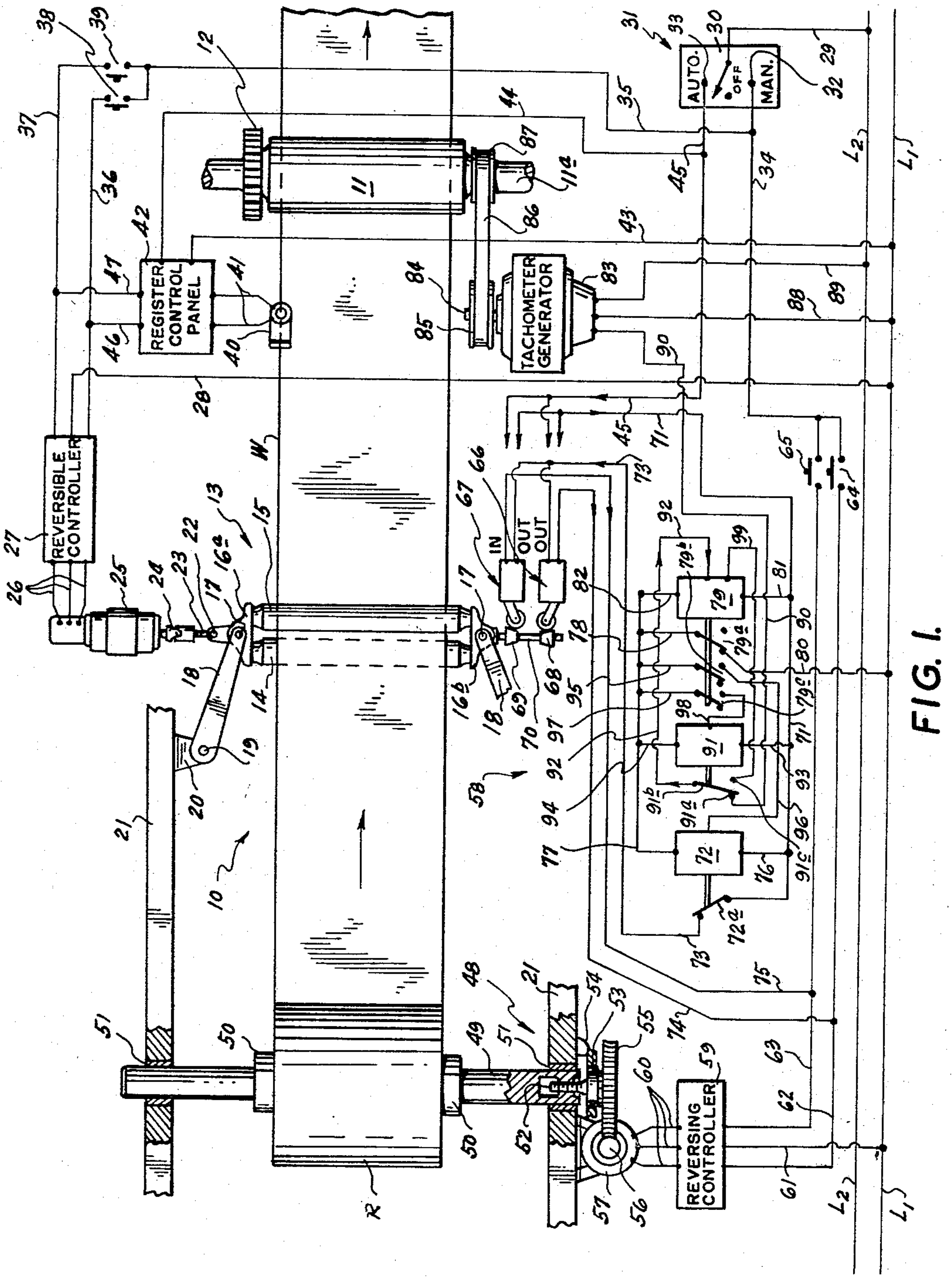

This invention relates generally to apparatus for transversely controlling a continuous moving web, and more particularly for maintaining transverse registration of a continuous web during its continuous movement, for example, to or through a printing press or other web processing machine.

Apparatus for maintaining transverse register of a moving web exists in which a fine or accurate transverse register correction device operative to correct for deviations of transverse registration within predetermined small limits is combined with a device for effecting coarse transverse register corrections of the web in advance of the fine transverse register correction device, and any deviation of the web beyond the limits of operation of the fine transverse register correction device results in actuation of the coarse transverse register correction device so that the latter returns the web to a position within the limits of operation of the fine or accurate transverse register correction device.

In apparatus of the described type, the limits of operation of the fine or accurate transverse register correction device are represented by predetermined limits of corrective displacements of web contacting elements thereof, and displacements of such elements beyond the predetermined limits thereof are detected to cause actuation of the coarse transverse register correction device. Since deviations of transverse registration of the web are sensed after the fine transverse register correction device, that is, at a location along the web spaced substantially from the coarse transverse register correction device in the direction of movement of the web, there is a delay or time lag between the introduction of coarse transverse register corrections and the sensing thereof. It will be apparent that such delay or time lag varies inversely with respect to the web speed. Thus, at moderate to slow web speeds, the substantial time lag between the introduction of a coarse transverse register correction and the sensing thereof will result in over-correction and hunting by the coarse transverse register correction device if the latter is actuated continuously in response to detection of displacements of the web contacting elements of the fine transverse register correction device beyond the operating limits thereof. However, at relatively high web speeds, for example speeds in the range between approximately 500 and 2000 or more feet per minute, the time lag or delay in sensing corrections effected by the coarse transverse register correction device is so small as to have no appreciable affect on the sensitivity of the controlled actuation of the coarse transverse register correction device.

Although it has been proposed to effect intermittent actuation of the coarse transverse register correction device when deviations of transverse registration exceed the operating limits of the fine transverse register correction device, and to make the frequency of intermittent actuation correspond to the web speed, so that each actuation of the coarse transverse register correction device produces an incremental correction which is sensed and responded to at the fine transverse register correction device before the next actuation of the coarse transverse register correction device, such intermittent actuation is effected throughout the entire range of speeds at which the web may be moved or fed. Intermittent actuation of the coarse transverse register correction device at the high frequencies necessary to correspond to relatively high web speeds, for example, in the range between approximately 500 and 2000 or more feet per minute, does not appreciably affect the accuracy or sensitivity of the transverse register control, but does lead to difficulties in the controls for the motor or other means by which the coarse transverse register correction device is actuated.

Accordingly, it is an object of this invention to provide apparatus of the described type for maintaining transverse register of a moving web, wherein the coarse transverse register correction device is operable either intermittently or continuously in dependence on web speed in order to overcome deviations of transverse registration beyond the normal operating range of the fine or accurate transverse register correction device.

Another object is to provide apparatus having the above characteristics, wherein, during intermittent operation of the coarse transverse register correction device, each period of operation of that device is of uniform duration to effect a predetermined increment of transverse register correction, and the intervals between successive periods of operation are varied as a function of web speed so as to ensure that the affect of each increment of transverse register correction is sensed and responded to by the fine transverse register correction device prior to commencement of the next period of operation of the coarse transverse register correction device for avoiding hunting by the latter.

In accordance with an aspect of this invention, an apparatus of the described character for maintaining transverse register of a moving web is provided with a first time delay means energized simultaneously with the commencement of operation of the coarse transverse register correction device and adapted to interrupt such operation after a predetermined actuating time, and a second time delay means also energized simultaneously with the commencement of operation of the coarse transverse register correction device and being effective to interrupt energization of the first time delay means after an actuating time which is varied as an inverse function of the web speed and ranges between actuating times that are respectively longer and shorter than the predetermined actuating time of the first time delay means, whereby the coarse transverse register correction device is operable continuously and intermittently at web speeds that are respectively greater and less than the web speed for which the actuating time of the second time delay means is equal to the predetermined actuating time of the first time delay means.

In a particular embodiment of the invention, the coarse transverse register correction device is operable electrically through an energizing circuit having detecting switch means therein which are actuated as a result of deviations of transverse registration beyond the normal operating range of the fine transverse register correction device, and a first time delay relay of predetermined actuating time has a normally closed contact interposed in such energizing circuit and is energized, in turn, through a circuit that includes the detecting switch means and a normally closed contact of a second time delay relay having its actuating time varied as an inverse function of web speed so as to be either longer or shorter than the predetermined actuating time of the first relay, thereby to effect continuous or intermittent operation, respectively, of the coarse transverse register correction device upon actuation of the detecting switch means. The second time delay relay may be advantageously of the type having an R-C impedance network on which there is impressed the variable output voltage of a tachometer generator driven at a speed proportional to web speed, and the second time delay relay is preset to have an actuating time equal to the predetermined actuating time of the first time delay relay when the output voltage of the tachometer generator corresponds to a web speed above which continuous operation of the coarse transverse register correction device is desired.

Figures 2, 3:
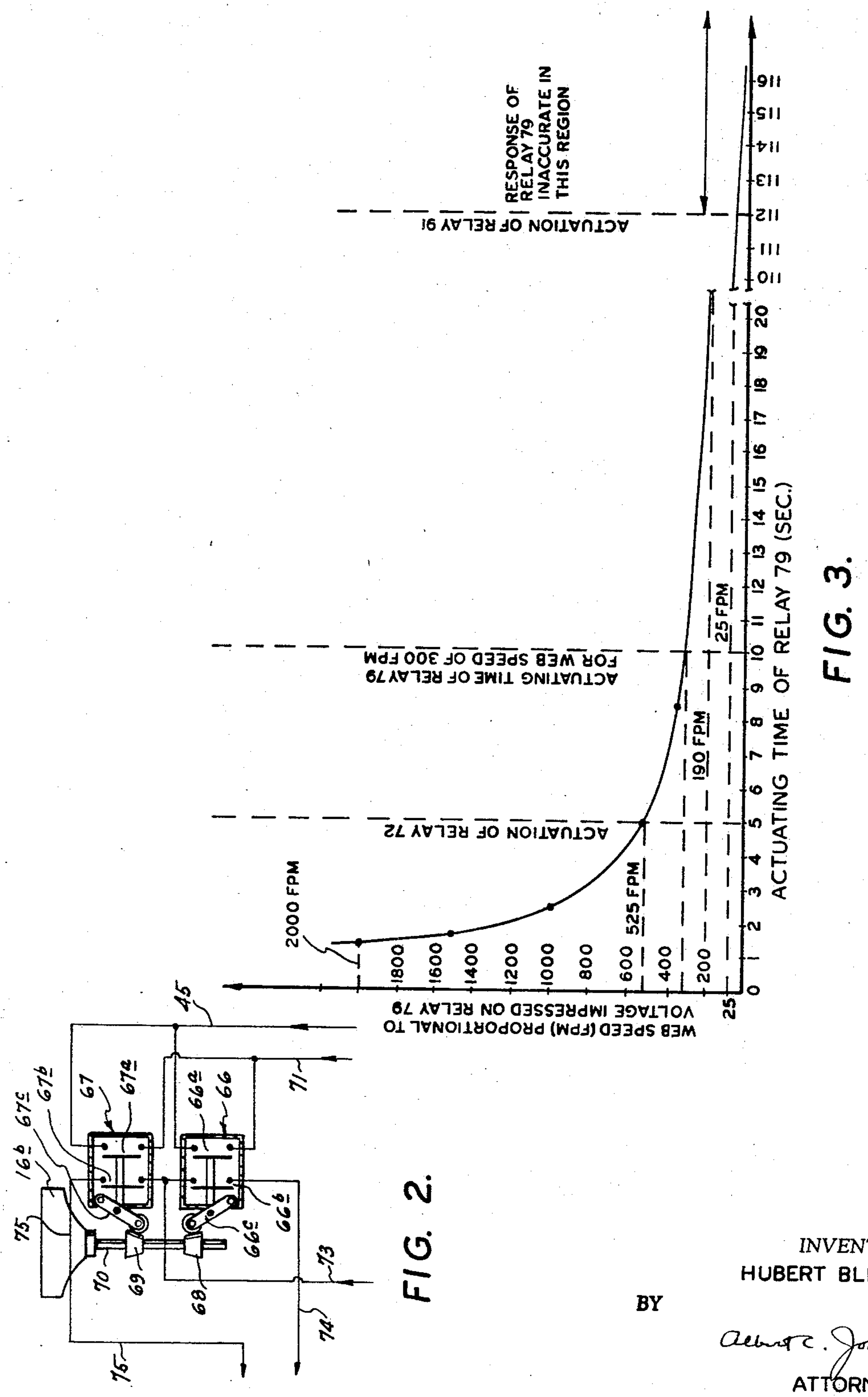

The above, and other objects, features and advantages of the invention, will be apparent in the following detailed description of an illustrative embodiment thereof which is to be read in connection with the accompanying drawings forming a part hereof, and wherein:

FIG. 1 is a schematic top plan view which is partly in section and which shows an apparatus for maintaining transverse registration of a moving web in accordance with this invention;

FIG. 2 is a schematic, enlarged detail view of the means included in the apparatus of FIG. 1 for detecting deviations of transverse registration of the web beyond the normal operating limits of the fine transverse register correction device of the apparatus; and FIG. 3 is a graph showing a typical relationship between the web speed and the actuating or tripping time of one of the relays included in a control system for the apparatus in accordance with the invention.

Referring to FIG. 1 of the drawing, it will be seen that the invention is there shown applied to an apparatus 10 for the maintenance of transverse registration, that is, a desired lateral position, of a moving web W relative to printing cylinders 11 (only one of which appears) or any other web processing device during the unwinding and feeding of such web from a web supply roll R. The feeding of web W may be effected by suitably rotating cylinders 11, as through a gear 12, so as to drive the web at the peripheral speed of the cylinders.

The illustrated apparatus 10 generally comprises a fine or accurate transverse register correction device 13 which engages web W prior to the printing or other web processing cylinders 11 with respect to which the web is to be transversely registered. The device 13 is shown to include parallel web contacting rollers 14 and 15 having their opposite ends rotatably journaled in bearing blocks **16*a* and 16*b* which are centrally pivoted on pins 17 carried by the free ends of arms 18. Arms 18 are pivotally mounted on shafts 19 carried by brackets 20 extending from side frame members 21, and the various parts are dimensioned so that, when rollers 14 and 15 are in their illustrated central position, arms 18 converge in the direction of movement of the web. The bearing block 16*a* carries a nut member 22 in threaded engagement with an adjustment screw 23 which is connected by a universal coupling 24 with the shaft of a reversible correction motor 25 mounted on the adjacent side frame member 21**.

It will be apparent that rotation of the shaft of motor 25, in one direction or the other, causes corresponding lateral displacement of rollers 14 and 15 which, by reason of the previously mentioned convergence of arms 18 in the neutral or central position of the rollers, are also tilted or inclined from the lateral. As shown on FIG. 1, the web W passes over roller 14 and then under roller 15 so that the tilting action of the rollers that accompanies the lateral displacement thereof is effective to urge the web laterally in the same direction as the lateral displacement of rollers 14 and 15.

The motor 25 is connected through conductors 26 with a reversing controller 27 of conventional design. The controller 27 is, in turn, connected by a conductor 28 with a power supply line $L_1$, while the other power supply line $L_2$ has a conductor 29 extending therefrom to the manually movable contact 30 of a selector switch 31 having fixed contacts 32 and 33 which are selectively engageable by contact 30 for either manual control or automatic control of the transverse registration of the web. A conductor 34 extending from the manual control contact 32 is connected by a conductor 35 with two parallel conductors 36 and 37 extending to the reversing controller 27 and having normally open push-button switches 38 and 39 respectively interposed therein. When switch 31 is positioned for manual control actuation of one or the other of push-button switches 38 and 39 is effective to cause operation of motor 25 in a corresponding direction, thereby to adjust the lateral position of rollers 14 and 15.

When selector switch 31 is disposed for automatic control of transverse registration of the web, that is, when contact 30 engages contact 33, reversing controller 27 for motor 25 is preferably energizable by means of a photoelectric control system including a photoelectric scanning head 40 that may be of the type commercially available from the Specialty Control Department of General Electric Company, Waynesboro, Va., as item No. 3S7515PS102. Scanning head 40 is suitably mounted so that a light source therein directs a beam of light against either the longitudinal edge of the moving web or against a register line preprinted along such edge at a location along the web that is intermediate transverse register correction device 13 and printing cylinders 11 or any other web processing device with which an edge of the moving web is to be transversely registered.

The scanning head 40 is laterally located so that, when there is correct transverse registration between the related longitudinal edge of the web or the register line preprinted thereon and cylinders 11, the area or region of the web surface illuminated by the beam of light from the scanning head is exactly bisected by the longitudinal edge of the web or by one longitudinal edge of the preprinted register line thereon, and thereby establishes the normal intensity of light reflected from the web to a photoelectric cell, also included in scanning head 40, during correct transverse register. Any deviation of the transverse position of the longitudinal edge of the web toward one side or the other from the position for correct transverse register causes a change in the intensity of light reflected by the web from the light source of head 40 into the photoelectric cell of the latter, and thereby alters the voltage generated by the cell.

The voltage generated by the photoelectric cell of head 40 is fed through conductors 41 to a register control panel 42 which may be of the type that is commercially available from the Specialty Control Department of General Electric Company, Waynesboro, Va., as item No. 3S7515SR100, and which generally includes a Wheatstone bridge network that is balanced when the strength of the electrical signal from scanning head 40 corresponds to correct transverse register of the web. The register control panel 42 is energized, during automatic control, by way of conductors 43 and 44 respectively extending from power supply line $L_1$ and from a conductor 45 connected to automatic control contact 33 of selector switch 31. Any deviation in the strength of electrical signals received from scanning head 40 serves to unbalance the bridge network in control panel 42 and thereby generates an error signal which is suitably amplified within control panel 42. The amplified error signal is fed from the control panel through conductor 46 to conductor 36 or through conductor 47 to conductor 37 for suitably energizing the reversing controller 27 and causing the necessary operation of motor 25 in the direction for laterally displacing rollers 14 and 15 in the sense required to restore the desired accurate transverse registration of the web.

So long as the deviation of the moving web from transverse registration with respect to printing cylinders 11 or other web processing device is within a predetermined small range, device 13 operates to effect fine or accurate transverse register corrections in the manner previously described herein. However, if the deviation of the web from transverse register with respect to printing cylinders 11 is beyond the predetermined small range or limits of accurate operation of device 13, then a second transverse register correction device 48 is operated to impart relatively coarse transverse register corrections to the web in advance of device 13 for returning the web to within the limits of the normal operating range of device 13.

In the illustrated apparatus 10, coarse transverse register correction device 48 is shown in the form of a reel sidelay control device included in a rollstand by which web supply roll R is supported during the unwinding of the web W therefrom for feeding movement to printing cylinders 13. The device 48 includes an axially movable shaft or spindle 49 carrying reel or spider arms 50 between which web supply roll R is rotatably supported. The end portions of shaft 49 are slidable in bearings 51 carried by side frame members 21, and one end portion of shaft 49 has an axially opening, tapped bore threadably engaged by an adjusting screw 52. The adjusting screw 52 is rotatably supported and held against axial displacement in a bearing 53 carried by a support 54 extending from the adjacent side frame member 21. A worm wheel 55 is joined to screw 52 and engaged by a worm 56 suitably connected to the shaft of a reversible correction motor 57 also mounted on the adjacent side frame member 21. Thus, operation of motor 57 so as to rotate its shaft in one direction or the other effects corresponding rotation of adjusting screw 52 to axially displace shaft 49 and thereby impart coarse transverse register correction to web W in advance of device 13.

So long as the deviation of the moving web from correct transverse register with respect to printing cylinders 11 is within the normal operating range of device 13, and thus is accurately correctable by the latter, coarse transverse register correction device 48 remains inoperative. However, if the deviation of the web from correct transverse register with respect to the printing cylinders or other web processing device is beyond the predetermined small range of accurate operation of device 13 so that, in seeking to correct for such deviation, rollers 14 and 15 are displaced by correction motor 25 to a relatively large extent, then device 48 is operated, as hereinafter described in detail, to impart coarse or relatively large transverse register corrections to the web in advance of device 13 for returning the web to a position within the limits of the normal operating range of device 13.

Since the device 48, when operated, imparts its coarse transverse register corrections to the web at unwinding roll R, that is, at a location spaced substantially along the web from the location of scanning head 40, there is a time lag or delay between the imparting of a transverse register correction to the web by device 48 and the sensing of the affect of that correction by scanning head 40. Further, the length of such time lag or delay is proportional to the distance along the web between the location of device 48 and the location of scanning head 40, and inversely proportional to the speed at which the web is moved from the unwinding roll R to the printing cylinders 11 or other web processing device. In the case of relatively high web speeds, for example, speeds in excess of approximately 500 feet per minute or any other predetermined value which is dependent upon the distance along the web from device 48 and the sensing of the affect of that correction by scanning head 40 will not adversely affect the accuracy and sensitivity of the apparatus 10 in maintaining transverse registration of the moving web with respect to printing cylinders 11. However, in the case of moderate to slow web speeds, that is, when the web speed is below the previously mentioned predetermined value, the time delay or lag in the sensing by scanning head 40 of the affect of a transverse register correction imparted to the web by device 48 becomes increasingly significant in that rollers 14 and 15 may continue to be displaced to a relatively large extent even after device 48 has imparted a correction to the web sufficient to return the web to within the normal operating range of device 13. Thus, if device 48 is continuously operated in response to a relatively large displacement of rollers 14 and 15 beyond the limits of the normal operating range of device 13 when the web is moving at a moderate to slow speed, the device 48 may impart excessive transverse register corrections to the web, that is, transverse movements of the web greater than that required to return the web to within the limits of the normal operating range of device 13, and thereby cause hunting of the apparatus 10.

In accordance with the present invention, apparatus 10 is provided with a system 58 for controlling the operation of coarse register correction device 48 so as to effect continuous operation of device 48 so long as displacement of rollers 14 and 15 of device 13 beyond the limits of the normal operating range of the latter occur with the web W traveling at relatively high speeds, that is, at speeds in excess of an adjustably predetermined value, and to effect intermittent operation of device 48 so long as the excess displacements of rollers 14 and 15 occur with the web moving at a speed below the adjustably predetermined value.

As shown on FIG. 1, the system 58 for controlling the operation of device 48 includes a conventional reversing controller 59 connected by conductors 60 with correction motor 57 of device 48. Controller 59 is also connected by conductor 61 to supply line $L_1$ and by conductors 62 and 63, respectively having normally open push-button switches 64 and 65 interposed therein, to conductor 34 extending from manual control contact 32 of selector switch 31. Thus, when selector switch 31 is positioned for manual control, switches 64 and 65 can be selectively actuated for manually controlling the operation of device 48 so as to bring the web within the limits of the normal operating range of fine transverse register control device 13.

For automatic operation of device 48, control system 58 includes two detecting switches 66 and 67 which are alternately actuable by cams 68 and 69, respectively, mounted on a support 70 extending from bearing block **16*b* of device 13. As shown on FIG. 2, switch 66 has two normally open contacts 66*a* and 66*b* and a cam follower or actuating member 66*c* which is engageable by cam 68 and effective to simultaneously close both contacts 66*a* and 66*b* upon displacement of rollers 14 and 15 in one lateral direction beyond the respective limit of the normal operating range of device 13. Similarly, switch 67 has two normally open contacts 67*a* and 67*b* and a cam follower or actuating element 67*c* engageable by cam 69 and effective to close both contacts 67*a* and 67*b* in the event of lateral displacement of rollers 14 and 15 in the opposite direction beyond the respective limit of the normal operating range of device 13**.

Conductor 45 extending from the automatic control contact 33 of selector switch 31 is connected to one side of each of the normally open contacts **66*a* and 67*a* of switches 66 and 67, respectively, and the other sides of such contacts 66*a* and 67*a* are connected together to a conductor 71 which, as shown on FIG. 1, extends to one side of a normally closed contact 72*a* of a relay 72. A conductor 73 extends from the other side of normally closed contact 72*a* and, as shown particularly on FIG. 2, is connected to one side of each of contacts 66*b* and 67*b* of detecting switches 66 and 67. The other sides of contacts 66*b* and 67*b* are respectively connected by conductors 74 and 75 to conductors 62 and 63 extending to reversing controller 59**.

Thus, so long as contact **72*a* of relay 72 remains in its closed position, as shown, the actuation of one or the other of the detecting switches 66 and 67 in response to displacement of rollers 14 and 15 of device 13 beyond the limits of the normal operating range thereof is effective to complete an energizing circuit through either conductors 74 and 62 or conductors 75 and 63 to reversing controller 59 for operating motor 57 in the direction which causes transverse displacement of unwinding roll R in the sense returning web W to within the normal operating range of device 13**.

The relay 72 is of a conventional time delay type, for example, an R-C impedance network time delay relay of the kind that is commercially available from Struthers-Dunn, Inc., Pitman, N.J., as item 235AAXP, and which is adjustable to provide a predetermined time delay or actuating time of from .2 to 18 seconds between the initiation of energization of the relay 72 and the opening of its normally closed contact 72*a*.

The circuit for energizing time delay relay 72 includes a conductor 76 extending from conductor 71 to relay 72 and a conductor 77 extending from the latter and connected by a conductor 78, a normally closed contact 79*a* of a relay 79, and a conductor 80 with the supply line $L_1$. Thus, relay 72 is energized so long as one or the other of the detecting switches 66 and 67 is actuated to close its contact 66*a* or 67*a* and the contact 79*a* of relay 79 remains in its normally closed position, as shown. Thus, when one or the other of detecting switches 66 and 67 is actuated to energize relay 72, the latter remains energized until its energizing circuit is interrupted by opening of the normally closed contact 79*a* of relay 79.

The relay 79 is also a conventional time delay relay of the R-C impedance network type, for example, the commercially available relay specifically identified with respect to relay 72, but such relay is connected so as to provide a variable time delay or actuating time between the initiation of the energization thereof and the actuation or tripping of relay 79 for opening of its contact 79*a*. The energizing circuit for relay 79 includes conductors 81 and 82 extending from relay 79 to conductors 71 and 77, respectively, thereby connecting relay 79 in parallel with relay 72 so as to be energized simultaneously with the latter in response to the actuation of one or the other of detecting switches 66 and 67 so long as contact 79*a* remains in its normal closed position.

The charging rate, and hence the variable time delay provided by relay 79, is determined by a variable voltage fed thereto, as hereinafter described, from a conventional tachometer generator 83 which may be of the type that is commercially available from General Electric Company, East Orange, N.J., as item No. 5BC–46AB1528. The drive shaft 84 of tachometer generator 83 is driven at a speed which is proportional to the speed of movement of web W, for example, by providing a pulley 85 on shaft 84 engaged by a belt 86 which also runs around a pulley 87 on the shaft 11*a* of one of printing cylinders 11. Tachometer generator 83 is energized through conductors 88 and 89 extending from supply lines $L_1$ and $L_2$. The output voltage of generator 83, which varies as a function of the web speed, is transmitted by way of a conductor 90 to a fixed contact 91*a* of a third time delay relay 91 which has its movable contact 91*b* normally engaged with fixed contact 91*a*. A conductor 92 extends from the movable contact 91*b* of relay 91 to the charging circuit of relay 79 so as to impress the variable output voltage of generator 83 on such charging circuit so long as movable contact 91*b* of relay 91 remains in its normal position in engagement of fixed contact 91*a*.

Relay 91 may be of the same commercially available type as relay 72, but is adjustable to provide a time delay substantially larger than that provided by relay 72, for example, relay 91 may be adjustable to provide a time delay in the range between approximately 2 and 180 seconds. Relay 91 is energized simultaneously with relays 72 and 79 by being connected in parallel therewith through conductors 93 and 94 extending to conductors 71 and 77, respectively. Thus, relay 91 is energized so long as one or the other of detecting switches 66 and 67 is actuated and contact 79*a* remains in its normally closed position.

As shown, relay 79 further has normally open contacts 79*b* and 79*c* which are closed upon tripping or actuation of relay 79. The normally open contact 79*b* is interposed between a conductor 95 extending from conductor 77 and a conductor 96 extending to relay 72 for discharging the charging circuit of relay 72 when contact 79*b* closes in response to actuation or tripping of relay 79. Similarly, the normally open contact 79*c* is interposed between a conductor 97 extending from conductor 77 and a conductor 98 connected to relay 91 for discharging the charging circuit of the latter when contact 79*c* is closed in response to tripping or actuation of relay 79. The circuits associated with the time delay relays of the arrangement shown on FIG. 1 are completed by a conductor 99 connecting relay 79 with a fixed contact 91*c* of relay 91 which is engaged by the movable contact 91*b* when relay 91 is actuated or tripped, thereby to discharge or short the charging circuit of relay 79 and cause immediate actuation or tripping thereof.

Referring now to FIG. 3 which illustrates the relationship of the actuating or tripping time of relay 79 to the web speed, it will be seen that such tripping time is generally an exponential function of the web speed which is, in turn, proportional to the output voltage of tachometer generator 83 impressed on relay 79. In a typical example, as illustrated on FIG. 3, relay 72 is adjusted or preset to provide a time delay for example, an actuating or tripping time of 5 seconds, which is of sufficient duration to achieve a desired increment of transverse register correction of web W by reason of operation of motor 57 during such time delay. Further, the firing voltage of relay 79 is adjusted or preset so that the actuating or tripping time of relay 79 will correspond to that of relay 72, that is, relay 79 will also have an actuating or tripping time of 5 seconds in the example given, when the voltage output of generator 83 impressed on relay 79 corresponds to a predetermined web speed, for example, a web speed of 525 feet per minute, above which it is desired to achieve continuous operation of motor 57 so long as one of the other of detecting switches 66 and 67 is actuated. Thus, at web speeds greater than the predetermined value of 525 feet per minute, the actuating time of relay 79 will be less than 5 seconds, and hence less than the actuating or tripping time of relay 72, whereas, web speeds progressively less than the predetermined value of 525 feet per minute will result in actuating or tripping times of relay 79 that are progressively greater than 5 seconds, and hence progressively greater than the tripping time of relay 72. As the web speed is progressively reduced, a point is reached, for example, at a web speed of 25 feet per minute which corresponds to an actuating or tripping time of relay 79 of 112 seconds, beyond which the response of relay 79 to the further reduced output voltages of generator 83 becomes inaccurate. Accordingly, relay 91 is adjusted or preset so as to have an actuating or tripping time, for example, an actuating or tripping time of 112 seconds in the example given, which corresponds to the actuating or tripping time of relay 79 for the slowest web speed at which the response of relay 79 is still accurate.

The operation of the above described system 58 for controlling the operation of the coarse transverse register correction device 48 will now be described with reference to the following three typical web speed condition: (A) when the web speed exceeds the predetermined value, for example, of 525 feet per minute, which corresponds to the actuating or tripping time of relay 79 equal to the preset actuating or tripping time of relay 72, and beyond which continuous operation of device 48 is required; (B) when intermittent operation of device 48 is required, that is, when the web speed is less than the predetermined value of 525 feet per minute so as to result in an actuating or tripping time of relay 79 which is greater than the preset or adjusted tripping time of relay 72, but greater than the web speed, for example, 25 feet per minute, which corresponds to an actuating or tripping time for relay 79 equal to the actuating or tripping time of relay 91, and beyond which the response of relay 79 becomes inaccurate; and (C) when intermittent operation of device 48 is required and the web speed is less than the value, for example, 25 feet per minute, which corresponds to an actuating or tripping time of relay 79 equal to that of relay 91. In describing the operation of control Although a particular embodiment of the invention has been described in detail herein with reference to the accompanying drawings, it is also to be understood that the invention is not limited to that precise embodiment, and that various changes and modifications may be made therein by one skilled in the art without departing from the scope or spirit of the invention as defined in the appended claims.

What is claimed is:

1. In apparatus for maintaining transverse register of a moving web, the combination of a first correction device operative to correct deviations of transverse register of the web within a predetermined range, a second correction device in advance of said first correction device to effect relatively coarse corrections of the transverse register of the web, means operative upon deviation of the transverse register of the web beyond said range for effecting operation of said second correction device to return the web to a position within said range, and means controlling said second correction device and acting in dependence on the web speed to maintain said second correction device in operation continuously when the web speed exceeds a predetermined value, and intermittently at desired intervals when the web speed is below said predetermined value, until the web is returned to said position.

2. In apparatus for maintaining transverse register of a moving web, the combination of a first correction device operative to correct deviations of transverse register of the web within a predetermined range, a second correction device in advance of said first correction device to effect relatively coarse corrections of the transverse register of the web, means operative upon deviation of the transverse register of the web beyond said range for effecting operation of said second correction device to return the web to a position within said range, and means controlling said second correction device and acting in dependence on the web speed to maintain said second correction device in operation continuously when the web speed exceeds a predetermined value, and intermittently at desired intervals when the web speed is below said predetermined value, until the web is returned to said position, said controlling means including means operative to vary in inverse relation to the web speed the intervals between periods of the intermittent operation of said second correction device.

3. In apparatus for maintaining transverse register of a moving web including a first correction device operative to correct deviations of transverse register of the web within predetermined limits, a second correction device operable to effect relatively coarse corrections of the transverse register of the web in advance of said first correction device, and means for effecting operation of said second correction device to return the web to a position within said limits when deviations of transverse register of the web exceed said limits, the combination of first time delay means energized upon operation of said second correction device and adapted after a predetermined period of energization to interrupt the operation of said second correction device, second time delay means also energized upon operation of said second correction device and effective to interrupt energization of said first time delay means after a variable period of energization of said second time delay means, and means for varying said period of energization of the second time delay means with variations of the speed of movement of the web over a range that includes periods longer and shorter than said predetermined period of energization of the first time delay means, whereby said second correction device is operable continuously when the web speed exceeds a predetermined value, and intermittently at intervals dependent upon the web speed when the web speed is below said predetermined value.

4. In apparatus for maintaining transverse register of a moving web including a first correction device operative to correct deviations of transverse register of the web within predetermined limits, a second correction device having an actuating motor operable to effect relatively coarse corrections of the transverse register of the web in advance of said first correction device, and circuit means for energizing said motor including detecting switch means actuated upon a deviation of the transverse register of the web beyond said predetermined limits so as to operate said motor in the sense for returning the web to a position within said limits; the combination of first time delay relay means energized upon actuation of said detecting switch means to interrupt operation of said motor after a predetermined period of energization of said first relay means, second time delay relay means also energized upon actuation of said detecting switch means and effective to interrupt energization of said first relay means after a variable period of energization of said second relay means, and generator means for varying said period of energization of said second relay means with variations of the speed of movement of the web over a range that includes periods longer and shorter than said predetermined period of energization of the first relay means, whereby said second correction device is operable continuously when the web speed exceeds a predetermined value, and intermittently at intervals dependent upon the web speed when the web speed is below said predetermined value.

5. In apparatus for maintaining transverse register of a moving web including a first correction device operative to correct deviations of transverse register of the web within predetermined limits, a second correction device having an actuating motor operable to effect relatively coarse corrections of the transverse register of the web in advance of said first correction device, and energizing circuit means for said motor having detecting switch means therein actuated upon a deviation of the transverse register of the web beyond said predetermined limits to operate said motor in the sense for returning the web to a position within said limits; the combination of first time delay relay means having normally closed contacts interposed in said energizing circuit means for the motor and being operable to open said normally closed contacts after a predetermined period of energization of said first relay means, second time delay relay means having normally closed contacts and being operable to open said normally closed contacts thereof after a variable period of energization of said second relay means, energizing circuit means for said first and second relay means having interposed therein said normally closed contacts of the second relay means and said detecting switch means so as to energize said first and second relay means when said detecting switch means are actuated and said contacts of the second relay means are closed, generator means driven in synchronism with the movement of the web to generate a control voltage that varies with variations of the speed of movement of the web, and means impressing said control voltage on said second relay means for varying the period of energization of said second relay means with variations of the web speed over a range that includes periods longer and shorter than said predetermined period of energization of the first relay means, whereby to maintain said motor in operation continuously when the web speed exceeds a predetermined value, and intermittently at intervals in inverse relation to the web speed when the web speed is below said predetermined value, until the web is returned to said position.

system 58 for each of the foregoing conditions of web speed, it will be assumed that there has occured a deviation of transverse registration of web W relative to printing cylinders 11 beyond the limits of the normal operating range of fine transverse register correction device 13 so that the resulting relatively large lateral displacement of rollers 14 and 15 of device 13 has caused actuation of one or the other of detecting switches 66 and 67.

A. *When the web speed is in the range for which continuous operation of device 48 is required.*—Upon actuation of one or the other of detecting switches 66 and 67, relays 72, 79 and 91 are simultaneously energized by way of the described circuits that include the closed contact **66*a* or 67*a* and the normally closed contact 79*a* of relay 79. The output voltage of generator 83 is further impressed on relay 79 by way of conductor 90, engaged contacts 91*a* and 91*b* of relay 91 and conductor 92. So long as relay 72 is not actuated or tripped so that its contact 72*a* remains in its normally closed position, a circuit for operating motor 57 is provided from supply line $L_2$ through conductor 29, contacts 30 and 33, conductor 45, closed contact 66*a* or 67*a*, conductor 71, closed contact 72*a*, conductor 73, closed contact 66*b* or 67*b* of the actuated detecting switch, and either conductor 74 and 62 or 75 and 63 to the reversing controller 59 of motor 57, and from the reversing controller to line $L_1$ by way of conductor 61. Since a web speed greater than the predetermined value of 525 feet per minute beyond which continuous operation of device 48 is required results in an actuating or tripping time of relay 79 which is shorter than the adjusted actuating or tripping time of relay 72, that is, shorter than 5 seconds in the illustrated example, variable time delay relay 79 is actuated or tripped prior to tripping of relay 72, that, is, while contact 72*a* of relay 72 remains in its normal closed position. Tripping of relay 79 opens its normally closed contact 79*a* and thereby deenergizes all of the relays 72, 79 and 91. Actuation or tripping of relay 79 also closes its normally open contacts 79*b* and 79*c* so as to discharge the time delay R-C networks of relays 72 and 91 and thereby restore the relays to their initial condition. Since relay 79 does not have a hold circuit and is deenergized by opening of its contact 79*a*, relay 79 also returns to the condition shown on FIG. 1 immediately after it is actuated or tripped so that relays 72, 79 and 91 are once more energized. However, it will be apparent that, during each energizing cycle, relay 79 is tripped before expiration of the time delay for which relay 72 is adjusted so that contact 72*a* of relay 72 remains in its normally closed condition to permit continuous operation of motor 57 so long as one or the other of detecting switches 66 and 67** is actuated.

B. *When the web speed is in the range for which intermittent operation of device 48 is required, but above the speed at which the response of relay 79 becomes inaccurate.*—When the web speed is in the range between the value, for example, 525 feet per minute, above which continuous operation of device 48 is required, and the value, for example, 25 feet per minute, below which the response of relay 79 becomes inaccurate, the actuating or tripping time of relay 79 is greater than the actuating or tripping time of relay 72 and less than the actuating or tripping time of relay 91. For example, as shown on FIG. 3, for a web speed of 300 feet per minute, relay 79 may have an actuating or tripping time of 10 seconds. In the case of the foregoing example, relay 72, having been adjusted for an actuating or tripping time of 5 seconds, is tripped or actuated 5 seconds after the initiation of its energization in response to actuation of one or the other of detecting switches 66 and 67. During such time delay of 5 seconds, that is, prior to tripping of relay 72 and opening of its contact **72*a*, motor 57 is operated in a suitable direction to cause an increment of transverse register correction to be imparted to web W. Upon tripping of relay 72 and opening of its contact 72*a*, the previously described circuit for energizing motor 57 is interrupted at open contact 72*a*. After tripping of relay 72, relays 72, 79 and 91 continue to be energized through the described circuit that includes normally closed contact 79*a* of relay 79. Thus, motor 57 remains inoperative until relay 79 is actuated or tripped so as to open its contact 79*a* and close contacts 79*b* and 79*c* for returning relays 72, 79 and 91 to their original condition. The deenergizing or return to its original condition of relay 72 closes contact 72*a* and thereby initiates another period of operation of motor 57 which again terminates with tripping of relay 72. Thus, so long as one or the other of detecting switches 66 and 67 is actuated, motor 57 is intermittently operated. The length of each period of operation of motor 57 is determined by the preset actuating or tripping time of relay 72, and the intervals between the successive periods of operation of motor 57 are equal to the difference between the preset actuating or tripping time of relay 72 and the actuating or tripping time of relay 79 for the web speed in question. Thus, if the web speed is 300 feet per minute and the tripping time of relay 79 corresponding to that web speed is 10 seconds, as in the given example, 5 second intervals are provided between the successive 5 second periods of operation of motor 57. Further, since the actuating or tripping time of relay 79 increases in response to the progressive reduction of the web speed, it will be apparent that, as the web speed is progressively reduced, the intervals between the successive uniform periods of operation of motor 57** increase in duration as a function of the decreasing web speed.

C. *When the web speed is less than the minimum value for which the response of relay 79 is accurate.*—When the web speed is less than the minimum value for which the response of relay 79 is accurate, for example, less than 25 feet per minute, the tripping time of relay 79 is longer than the tripping time of relay 91. Thus, after relay 72 has timed out so as to open its contact **72*a* and thereby terminate a period of operation of motor 57, relays 72, 79 and 91 remain energized until relay 91 is actuated or tripped, for example, at the end of 112 seconds following commencement of its energization. Tripping of relay 91 causes movement of its contact 91*b* out of engagement with contact 91*a* and into engagement with contact 91*c*, thereby connecting conductors 92 and 99 for impressing line voltage on the R-C network of relay 79 by way of the closed contact 67*a* or 66*a* so that relay 79 is soon tripped or actuated. Tripping of relay 79 deenergizes relays 72, 79 and 91, as described above, so that contact 72*a* is again closed to initiate another period of operation of motor 57. Thus, when the web speed is less than 25 feet per minute, in the example given, motor 57 is operated intermittently, with each period of operation being of 5 seconds duration and each interval between successive periods of operation being of 107 seconds; that is, the difference between the actuating time of relay 72 and the actuating time of relay 91**.

From the above, it will be apparent that the control system 58 in accordance with this invention functions to effect either continuous or intermittent operation of coarse transverse register correction device 48 in dependence on web speed, and to vary the intervals between successive operating periods of device 48 as a function of web speed during intermittent operation, with a maximum limit being provided for such intervals between successive operating periods.

It is to be understood that the particular fine or accurate transverse register correction device 13 and coarse transverse register correction device 48 described herein may be replaced by other devices capable of performing the respective functions thereof. Further, the location at which the coarse transverse register corrections are imparted to the web need not be at the unwinding web roll, as shown, but may be at any other location along the web in advance of the fine transverse register correction device, for example, as disclosed in U.S. Patent No. 3,147,-898, issued Sept. 8, 1964 to William F. Huck.

6. Apparatus as in claim 5;
further comprising means to operate said second relay means irrespective of the control voltage impressed thereon after a predetermined period of energization of said second relay means which is substantially longer than said predetermined period of energization of the first relay means and which corresponds to the minimum control voltage to which said second relay means is accurately responsive.

7. Apparatus as in claim 5;
wherein said means to operate said second relay means includes third time delay relay means also connected in said energizing circuit means for the first and second relay means so as to be energized therewith, said third relay means being operative after said longer predetermined period of energization to interrupt impressing of said control voltage on said second relay means and to operate the latter.

8. In apparatus for maintaining transverse register of a moving web including a first correction device operative to correct deviations of transverse register of the web within predetermined limits, a second correction device having an actuating motor operable to effect relatively coarse corrections of the transverse register of the web in advance of said first correction device, and circuit means for energizing said motor including detecting switch means actuated upon a deviation of the transverse register of the web beyond said predetermined limits so as to operate said motor in the sense for returning the web to a position within said limits; the combination of
first time delay relay means energized upon actuation of said detecting switch means to interrupt operation of said motor after a predetermined period of energization of said first relay means,
generator means driven in synchronism with the movement of the web to generate a control voltage that varies with the speed of movement of the web, and
second time delay relay means also energized upon actuation of said detecting switch means and actuable by said control voltage to interrupt energization of said first relay means after a period of energization of said second relay means that varies in inverse relation to said control voltage over a range that includes periods longer and shorter than said predetermined period of energization of the first relay means, whereby to maintain said motor in operation continuously when the web speed exceeds a predetermined value, and intermittently at desired intervals when the web speed is below said predetermined value, until the web is returned to said position.

9. Apparatus as in claim 8;
further comprising means operative to actuate said second relay means irrespective of said control voltage after a predetermined period of energization of said second relay means that is substantially longer than said predetermined period of energization of the first relay means and corresponds to the minimum control voltage by which said second relay means is accurately actuable.

10. Apparatus as in claim 9;
wherein said means operative to actuate said second relay means irrespective of the control voltage includes third time delay relay means also energized upon actuation of said detecting switch means and being preset to actuate said second relay means after energization of said third relay means for said longer predetermined period of energization.

11. In apparatus for maintaining transverse register of a web being unwound from a supply roll and moved continuously through a rotary web processing device, the combination of
a first correction device operative within predetermined limits to correct deviations of transverse register of the web relative to the web processing device,
a second correction device operable on the unwinding supply roll to effect relatively coarse corrections of the transverse register of the web,
means for effecting operation of said second correction device to return the web to a position within said limits when a deviation of transverse register of the web exceeds one of said limits,
first time delay relay means energized upon operation of said second correction device and adapted after a predetermined period of energization to interrupt the operation of said second correction device,
generator means driven in synchronism with the rotary web processing device to generate a control voltage that varies with variations of the speed of movement of the web, and
second time delay relay means also energized upon operation of said second correction device and actuable by said control voltage to interrupt energization of said first relay means after a period of energization of said second relay means that varies in inverse relation to said control voltage over a range that includes periods longer and shorter than said predetermined period of energization of the first relay means, whereby said second correction device is operable continuously when the web speed exceeds a predetermined value established by a setting of said second relay means and is operable intermittently at intervals dependent upon the web speed when the web speed is below said predetermined value.

References Cited

UNITED STATES PATENTS

| | | | |
|---|---|---|---|
| 2,946,532 | 7/1960 | Carter | 242—57.1 |
| 3,009,664 | 11/1961 | Huck | 242—57.1 |
| 3,147,898 | 9/1964 | Huck | 226—17 |

M. HENSON WOOD, Jr., *Primary Examiner.*

J. N. ERLICH, *Assistant Examiner.*